(12) United States Patent
Yokota et al.

(10) Patent No.: US 9,453,482 B2
(45) Date of Patent: Sep. 27, 2016

(54) CONSTRUCTION MACHINE

(71) Applicant: KOBELCO CONSTRUCTION MACHINERY CO., LTD., Hiroshima-shi (JP)

(72) Inventors: Jumpei Yokota, Hiroshima (JP); Masaaki Murakami, Hiroshima (JP); Tomotaka Kita, Hiroshima (JP); Yoshihiko Ueda, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/520,968

(22) Filed: Oct. 22, 2014

(65) Prior Publication Data

US 2015/0136503 A1    May 21, 2015

(30) Foreign Application Priority Data

Nov. 20, 2013  (JP) .................................. 2013-239423

(51) Int. Cl.
  *F02M 35/04*   (2006.01)
  *F02M 35/16*   (2006.01)
  *F02M 35/08*   (2006.01)
  (Continued)

(52) U.S. Cl.
  CPC ............ *F02M 35/164* (2013.01); *B60K 13/02* (2013.01); *E02F 9/0866* (2013.01); *E02F 9/0883* (2013.01); *F02M 35/048* (2013.01); *F02M 35/084* (2013.01); *F02M 35/086* (2013.01)

(58) Field of Classification Search
  CPC .. F02M 35/02; F02M 35/164; F02M 35/086; F02M 35/048; F02M 35/084; B60K 13/00; B60K 13/02; B60K 11/00; E02F 9/0866
  See application file for complete search history.

(56) References Cited

U.S. PATENT DOCUMENTS 2,896,594 A * 7/1959 Ashton ...................... 123/41.04
3,307,336 A * 3/1967 Dewsberry .................... 55/337
(Continued)

FOREIGN PATENT DOCUMENTS

DE   10 2010 021 862 A1   12/2011
JP          63-48965 U      4/1988
(Continued)

OTHER PUBLICATIONS

Machine translation JP2003184670.*
(Continued)

*Primary Examiner* — Emma K Frick
(74) *Attorney, Agent, or Firm* — Oblon, McClelland, Maier & Neustadt, L.L.P.

(57) ABSTRACT

Provide is a construction machine allowing an air cleaner to be located entirely low while securing dust-discharge function thereof, with no risk of adverse effects such as diffusion of dusts and complication in structure. The construction machine includes an engine and an air cleaner connected to an intake-side portion of the engine to filter intake air. The air cleaner includes an air-cleaner main body which filters the intake air and an evacuator which discharges dusts separated from the intake air and protrudes downward beyond the air-cleaner main body. The air-cleaner main body is placed on an air-cleaner placement surface, the evacuator protruding downward beyond the air-cleaner placement surface at a position deviated outward from the air-cleaner placement surface.

4 Claims, 6 Drawing Sheets

(51) Int. Cl.
*E02F 9/08* (2006.01)
*B60K 13/02* (2006.01)

(56) References Cited

U.S. PATENT DOCUMENTS

| | | | |
|---|---|---|---|
| 3,429,108 A * | 2/1969 | Larson | 55/432 |
| 3,672,130 A * | 6/1972 | Sullivan et al. | 55/323 |
| 3,934,992 A * | 1/1976 | Thompson | 55/324 |
| 4,482,368 A | 11/1984 | Roberts | |
| 6,419,718 B1 * | 7/2002 | Klug et al. | 55/320 |
| 6,874,589 B1 * | 4/2005 | Williams | 180/68.3 |
| 7,204,329 B2 * | 4/2007 | Pfohl et al. | 180/68.3 |
| 7,967,094 B2 * | 6/2011 | Matsushita | B62D 25/10 180/69.2 |
| 8,641,792 B2 * | 2/2014 | Vladaj et al. | 55/385.3 |
| 2010/0025136 A1 * | 2/2010 | Matsushita | B62D 49/085 180/68.3 |
| 2013/0174526 A1 * | 7/2013 | Watanabe et al. | 55/385.7 |

FOREIGN PATENT DOCUMENTS

| | | |
|---|---|---|
| JP | 64-11354 U | 1/1989 |
| JP | 2-33461 A | 2/1990 |
| JP | 11-46514 A | 2/1999 |
| JP | 2002-89380 A | 3/2002 |
| JP | 2003-184670 | 7/2003 |
| JP | 2003-184670 A | 7/2003 |
| JP | 2003-193861 A | 7/2003 |
| JP | 2005-330826 A | 12/2005 |
| JP | 2008-254519 A | 10/2008 |
| JP | 2013-177748 A | 9/2013 |

OTHER PUBLICATIONS

Extended European Search Report issued Apr. 7, 2015 in Patent Application No. 14190606.5.
Office Action issued Sep. 15, 2015 in Japanese Patent Application No. 2013-239423 (with English language translation).

* cited by examiner

CONSTRUCTION MACHINE

TECHNICAL FIELD

The present invention relates to a construction machine including an air cleaner, such as an excavator.

BACKGROUND ART

There is conventionally known a construction machine including an engine and an air cleaner connected to the engine. Air cleaners thus provided in a construction machine are disclosed, for example, in Japanese Utility Model Application Laid-open No. S63-48965. Besides, an air cleaner including an evacuator for discharging dusts and placed on an upper surface of a hood as a house cover which covers an engine room is disclosed in Japanese Patent Application Laid-open No. 2003-184670. Furthermore, Japanese Patent Application Laid-open No. 2003-184670 discloses a technique including: providing an air ejection port in an upper portion of a house cover corresponding to the air-cleaner placement surface 29; directing the air ejection port to the lower side of an evacuator; and ejecting a part of cooling air sucked into the inside of the house cover by a cooling fan during engine operation to blow off the dusts. This technique, however, requires a complicated structure which increases cost and involves various problems such as leakage of engine noise or generation of ejection sound. Furthermore, the cooling air cannot be ejected until the pressure inside the house cover has been sufficiently increased, which hinders the function of blowing off dusts from being effective. On contrary, when the function of blowing off dusts is effective, the dusts may be widely diffused to thus give a negative effect on equipment.

SUMMARY OF THE INVENTION

An object of the present invention is to provide a construction machine allowing an air cleaner to be located entirely low while securing dust-discharge function thereof, with no risk of adverse effects such as diffusion of dusts or complication in structure.

Provided by the present invention is a construction machine including: an engine; and an air cleaner connected to an intake-side portion of the engine to filter intake air. The air cleaner includes an air-cleaner main body which filters the intake air and an evacuator which discharges dusts separated from the intake air and protrudes downward beyond the air-cleaner main body. The air-cleaner main body is placed on an air-cleaner placement surface, the evacuator protruding downward beyond the air-cleaner placement surface at a position deviated outward from the air-cleaner placement surface.

DESCRIPTION OF EMBODIMENTS

Figure 9:
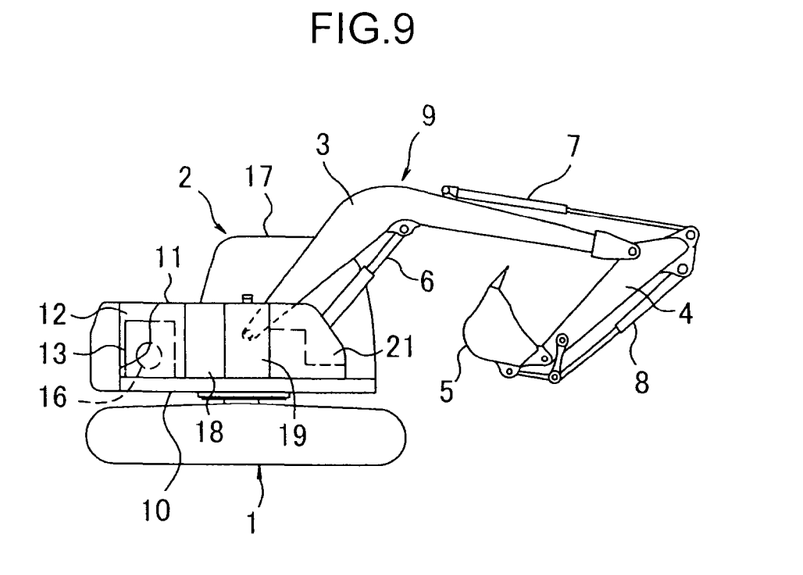
FIG. 9 is a side view of an excavator according to a comparison example for explaining the present invention.
Figure 10:
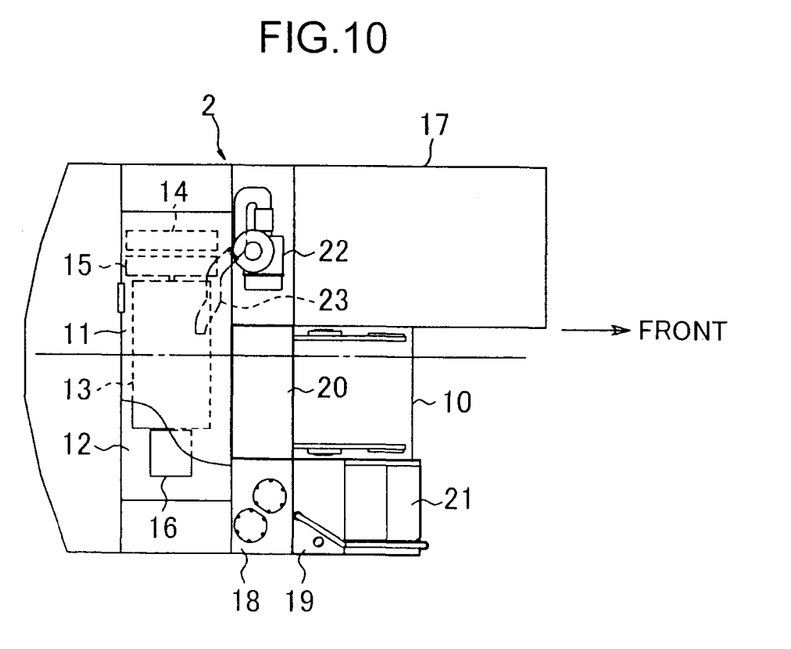
FIG. 10 is a plan view of the excavator shown in FIG. 9.

In advance of the description about the embodiments, explained is an excavator according to a comparative example virtually assumed for describing the embodiments, with reference to FIGS. 9 and 10.

The excavator includes a crawler-type lower travelling body 1, an upper slewing body 2 mounted on the lower travelling body 1 slewably about an axis perpendicular to the ground, and a working attachment 9 loaded on a front portion of the upper slewing body 2. The attachment 9 has a boom 3, an arm 4, a bucket 5, and a plurality of cylinders, namely, a boom cylinder 6, an arm cylinder 7 and a bucket cylinder 8 which operate the boom 3, the arm 4 and the bucket 5, respectively.

The upper slewing body 2 has an upper frame 10 as a base, and various devices and equipment which are mounted on the upper frame 10. Specifically, mounted on the upper frame 10 are an engine room 12 and a cabin 17. The engine room 12 is provided on a rear portion of the upper frame 10, having a bonnet 11 adapted to open and close an opening which faces upward. In the engine room 12, there are installed an engine 13 as a power source, and related devices of the engine 13, namely, a radiator 14, a cooling fan 15, a hydraulic pump 16, etc. The cabin 17 is installed forward of the engine room 12, and at one of right and left sides (usually, at the left side; hereinafter, the description will be based on this assumption). In the present specification, "front and rear" and "right and left" are directions from the viewpoint of an operator who is seated in the cabin 17.

In the upper frame 10, there are further provided a hydraulic tank 18, a fuel tank 19, a center foothold 20, and a climbing step 21. The hydraulic tank 18 is placed on an opposite side to the cabin 17 with respect to the right and left direction (usually, at the right side) in the upper frame 10, and located forward of the engine room 12, and accumulates hydraulic fluid. The fuel tank 19 is arranged with the hydraulic tank 18 in the front and rear direction, and accumulates a fuel. The fuel tank 19 has an oil feeding portion 19*a*. The center foothold 20 is provided on a widthwise intermediate portion of the upper frame 10 immediately forward of the engine room 12, in order to allow maintenance of devices including the engine 13 in the engine room to be performed. The climbing step 21 is disposed forward of the fuel tank 19 and formed into a stair shape for guiding a maintenance person to the center foothold 20. Thus formed is a path for maintenance which reaches the center foothold 20 through the climbing step 21 and the upper surface of the fuel tank 19. FIG. 10 indicates a thick line surrounding the path and the center foothold 20 to distinguish them from other parts.

Over the upper frame 10, there are arranged an air cleaner 22 and an air intake piping 23. The air cleaner 22 is placed, for example, between the engine room 12 and the cabin 17 at the left side of the upper frame 10, in order to filter engine intake air. The air intake piping 23 interconnects the air cleaner 22 and an air suction port of the engine 13.

Figure 11:
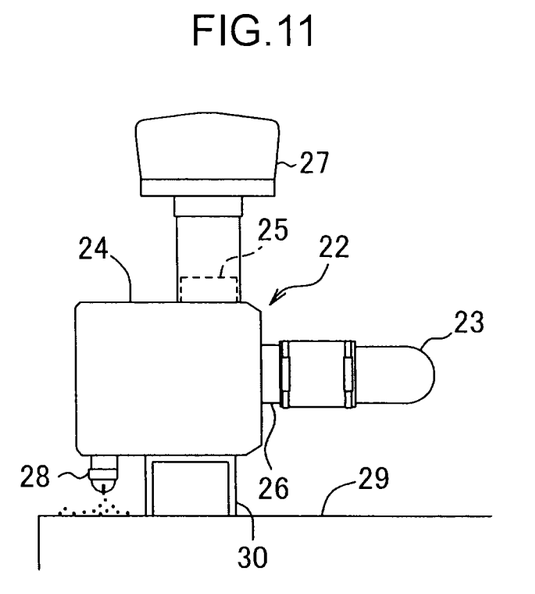
FIG. 11 is a front view of a region where an air cleaner is mounted in the excavator shown in FIG. 9.

The air cleaner 22 has a configuration shown in FIG. 11.

The air cleaner 22 includes: a main body 24 internally accommodating a not-graphically-shown filter and having a cylindrical outer peripheral surface; an air intake portion 25 protruding upward beyond the cylindrical outer peripheral surface of the main body 24 and having an air intake port; an exhaust portion 26 provided at one end side in the axis direction of the main body 24 and having an exhaust port; and an evacuator 28. To the air intake portion 25 and air exhaust portion 26, connected are an air intake cylinder 27 and an air intake pipe 23, respectively. The evacuator 28 protrudes downward beyond a lower surface of one end opposed to the air exhaust portion, of opposite ends of the main body 24, allowing dusts shown as large black dots separated from air by centrifugal force or the like during engine operation to be discharged downward through the evacuator 28.

As shown in FIG. 11, there is defined an air-cleaner placement surface 29 on which the air cleaner 22 is placed. In the prior art disclosed in Japanese Patent Application Laid-open No. 2003-184670, the upper surface of the housing cover corresponds to the air-cleaner placement surface. On the air-cleaner placement surface 29, installed is an air-cleaner mount 30 for the air cleaner 22.

In the above comparison example, the air cleaner 22 has to be disposed so as to oppose the evacuator 28 to the air-cleaner placement surface 29, specifically, so as to produce an interval corresponding to the sum of protrusion size of the evacuator 28 and a size of a space required for discharge of dusts between the main body 24 and the air-cleaner placement surface 29, which causes the position of the entire air cleaner 24 to be high. This causes, in the case of setting the air-cleaner placement surface 29 to a high position like the prior art described in Japanese Patent Application Laid-open No. 2003-184670, the problems of increase in a height size of the entire machine which degrades transporting thereof or narrows operator's view from an operator's seat.

Besides, there can be another risk of stain of the air-cleaner placement surface 29 with dusts having discharged from the evacuator 28 onto the air-cleaner placement surface 29 to be dropped and deposited thereon or loss of dust discharge function due to the block of discharge port of the evacuator by the deposited dusts.

To solve the above problem, disclosed in Japanese Patent Application Laid-open No. 2003-184670 is a technique which includes: providing an air ejection port in an upper portion of a house cover corresponding to the air-cleaner placement surface 29; directing the air ejection port to the lower side of an evacuator; and ejecting a part of cooling air sucked into the inside of the house cover by a cooling fan during engine operation to blow off the dusts. This technique, however, requires a complicated structure which increases cost and involves various problems such as leakage of engine noise through the air ejection port or generation of ejection sound. Furthermore, the cooling air cannot be ejected until the pressure inside the house cover has been sufficiently increased, which hinders the function of blowing off dusts from being effective. On contrary, when the function of blowing off dusts is effective, the dusts may be widely diffused to thus give a negative effect on equipment.

Figure 7:
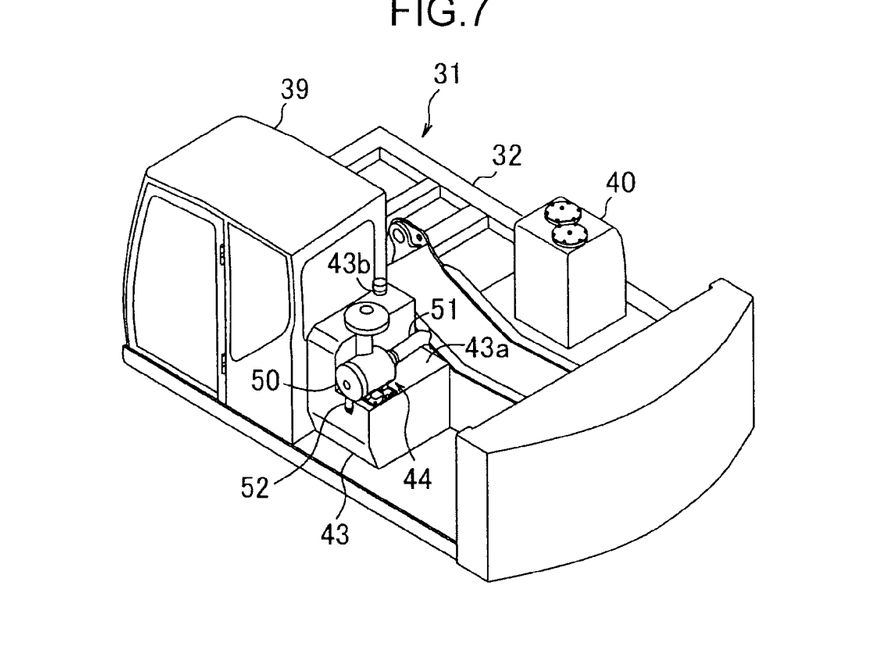
FIG. 7 is a perspective view of an upper slewing body of an excavator according to a second embodiment of the present invention.
Figure 8:
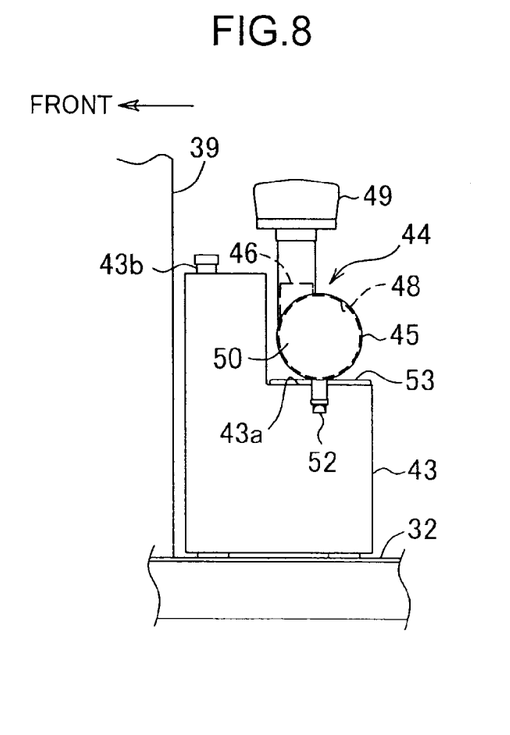
FIG. 8 is a side view of a portion where an air cleaner is placed in the excavator according to the second embodiment.

Each of the embodiments according to the invention solves the above problems. FIGS. 1 to 6 show a first embodiment according to the invention, and FIGS. 7 and 8 show a second embodiment according to the invention. In either of the first and second embodiments, the invention is applied to an excavator, which is common to the excavator according to the above comparison example shown in FIGS. 9 to 11, in the following points.

Figure 1:
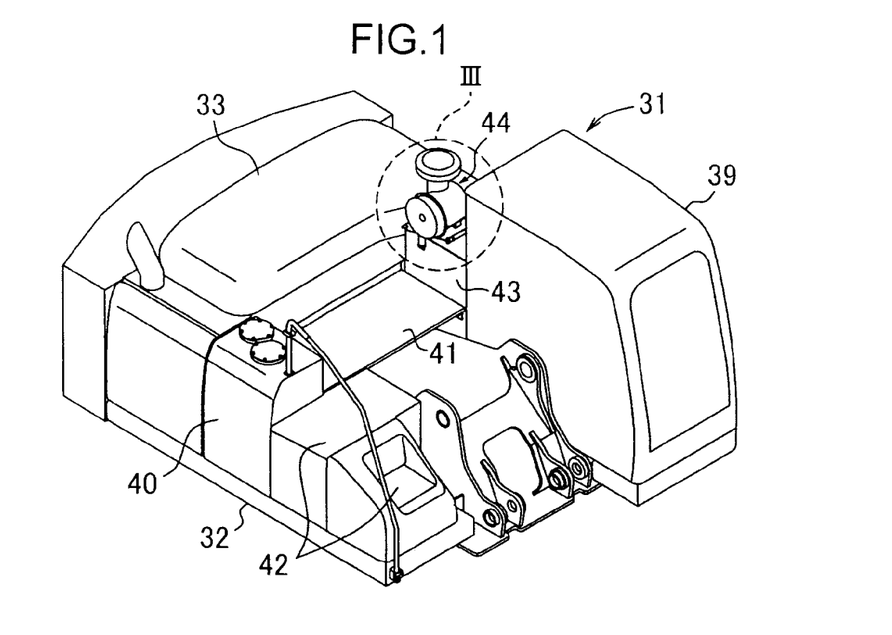
FIG. 1 is a perspective view of an upper slewing body of an excavator according to a first embodiment of the present invention.
Figure 2:
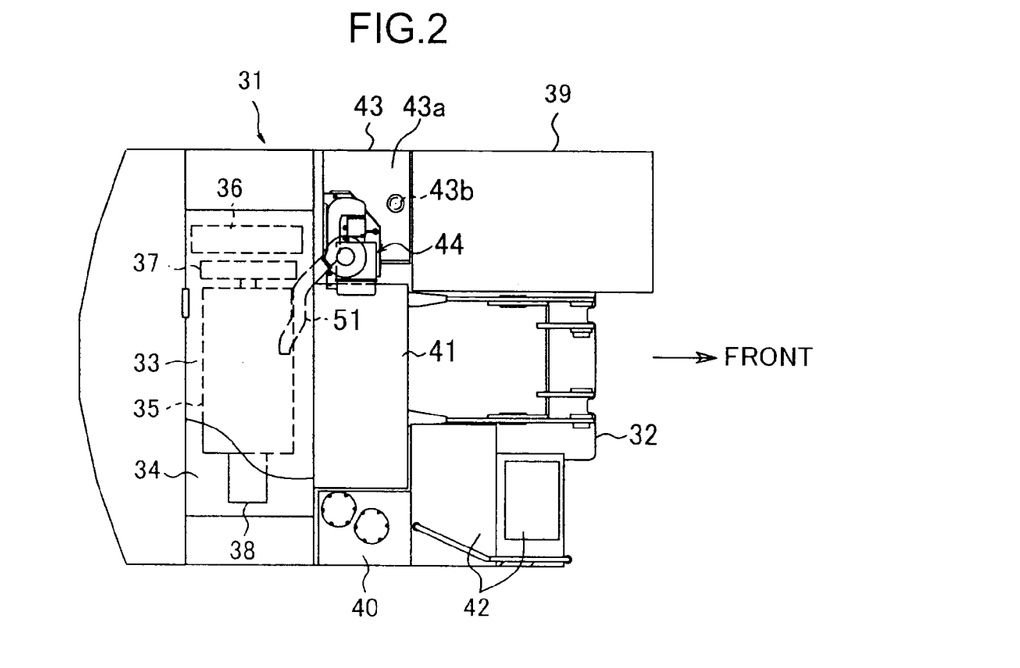
FIG. 2 is a plan view of the excavator.
Figure 3:
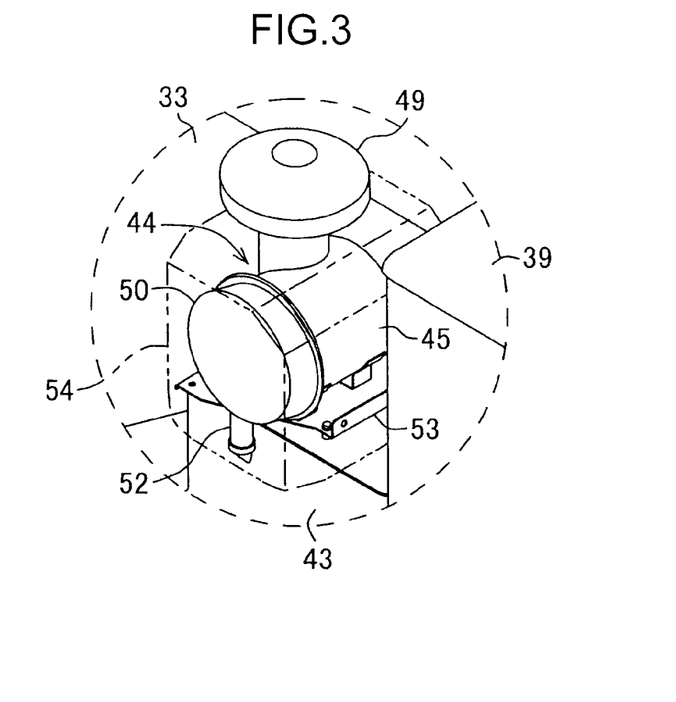
FIG. 3 is an enlarged view of a portion surrounded by a circle III in FIG. 1.

The excavator according to each of the first and second embodiments includes a not-graphically-shown crawler-type lower travelling body, an upper slewing body 31 mounted on the lower travelling body slewably about an axis perpendicular to the ground. The upper slewing body 31 has an upper frame 32 as a base, on which various devices and equipment are mounted. The various devices and equipment include an engine room 34, an engine 35 as a power source, related devices of the engine 35, a cabin 39, a plurality of tanks including a hydraulic oil tank 40 and a fuel tank 43, a center foothold 41, and a climbing step 42. The engine room 34 is provided in a rear portion of the upper frame 32, designed to be opened and closed by a bonnet 33. The engine 35 and the related devices are housed in the engine room 34. The related devices include a radiator 36, a cooling fan 37, and a hydraulic pump 38. The cabin 39 is installed at a position on a front side and the left side of the engine room 34. The hydraulic oil tank 40 is a tank which accumulates hydraulic oil, provided at a position on the opposite side to the cabin 39 with respect to the left and right direction in the upper frame 32, i.e., at the right side, and forward of the engine room 34. The center foothold 41 is used for maintenance of devices including the engine 35 in the engine room 34, and is provided immediately forward of the engine room 34 and at a widthwise intermediate portion of the upper frame 32. The climbing step 42 is formed into a stair shape to guide the maintenance person to the center foothold 41, and is disposed forward of the hydraulic oil tank 40.

In the first and second embodiments, the fuel tank 43 to accumulate the fuel is disposed forward of the cabin 39 and between the cabin 39 and the engine room 34 over the upper frame 32, allowing an air cleaner 44 which filters the intake air of the engine to be placed on the fuel tank 43.

In other words, while both of the hydraulic oil tank 18 and the fuel tank 19 in the comparative example shown in FIG. 10 are collected at the right side of the upper frame, the hydraulic oil tank 40 and the fuel tank 43 in the present embodiment are distributed on the right and left sides on the upper frame 32, respectively, and the air cleaner 44 is superposed on the fuel tank 43, that is, arranged three-dimensionally. The present arrangement enables an empty space forward of the hydraulic oil tank 40, that is, below the climbing step 42, to be produced, thus allowing additional other equipment (either one of or both of a liquid reducing-agent tank and a battery for hybrid machines, for example) to be installed in the produced space.

Furthermore, the detail of the first embodiment is described with reference to FIGS. 1 to 6.

Figure 4:
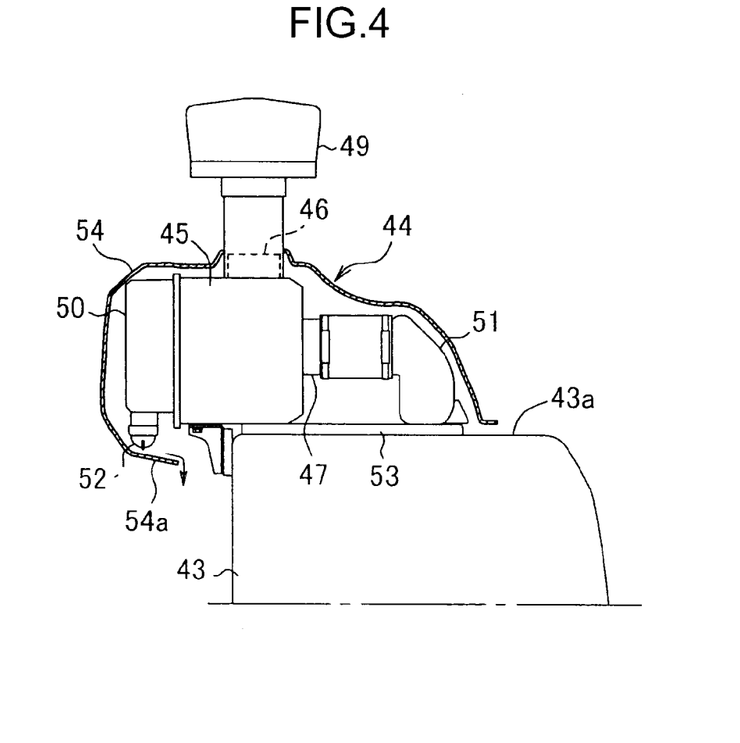
FIG. 4 is a front view of a portion shown in FIG. 3.
Figure 5:
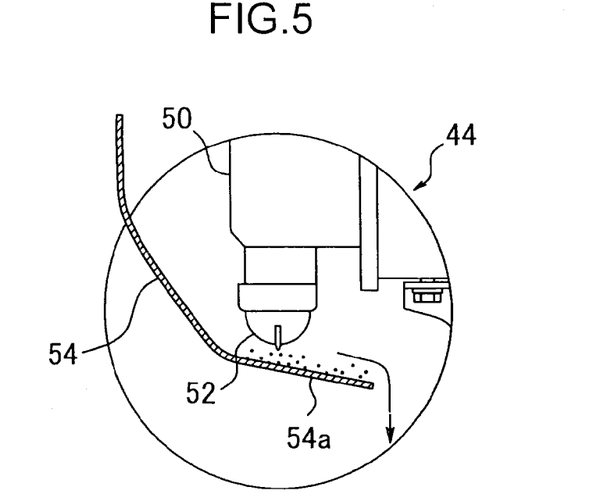
FIG. 5 is an enlarged view of a part of FIG. 4.
Figure 6:
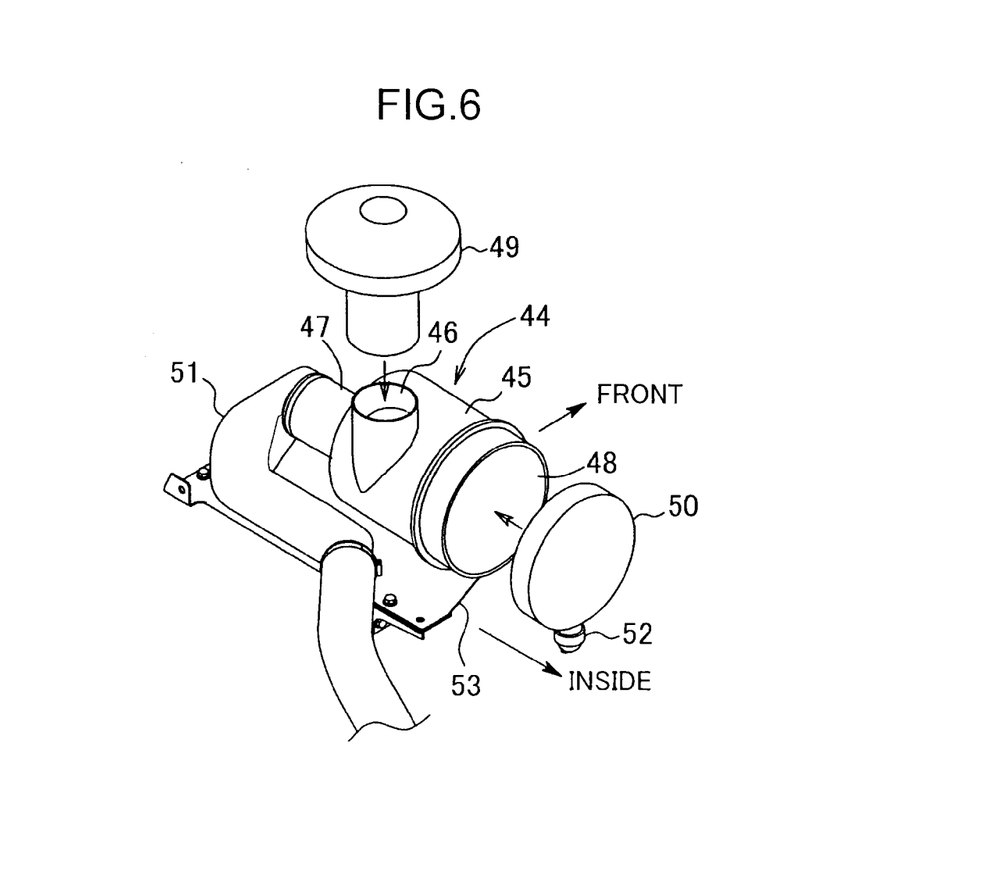
FIG. 6 is a partially exploded perspective view of an air cleaner in the excavator.

As shown in detail in FIGS. 3 to 6, the air cleaner 44 includes: an air-cleaner main body, an end cover 50 and an evacuator 52. The air-cleaner main body includes: a cylindrical main body 45 internally accommodating a not-graphically-shown filter and having a cylindrical outer surface; an air intake portion 46 protruding upward beyond the cylindrical outer peripheral surface of the main body 45 and having an air intake port; an exhaust portion 47 provided at one axial end side of the main body 45 and having an exhaust port; a filter take-in and take-out port 48 opened at an end part on the opposite side to the exhaust portion 47 as shown in FIG. 6; an air intake cylinder 49 fitted to the air intake portion 46. The exhaust portion 47 is connected to an air intake port of the engine 35 through an air intake pipe 51 shown in FIGS. 2 to 4 and 6. The end cover 50 is configured to be detachably attached to the main body 45 so as to close the filter take-in and take-out port 48. The evacuator 52 is attached to the end cover so as to protrude downward beyond the lower surface of the end cover 43, thus being allowed to be attached and detached with respect to the air-cleaner main body. The exhaust portion 40 is connected to an air suction port of the engine 28 via an air intake piping 45. The air cleaner 37 is covered with an outer cover 46.

The air cleaner 44 according to the embodiment is integrally attached to a bracket 53 together with the air intake pipe 51 in advance so as to configure what is called a sub-assembly. The bracket 53 is fastened to the upper surface of the fuel tank 43, for example, with bolts. Thus, in this embodiment, the upper surface 43a of the fuel tank 43 corresponds to an "air-cleaner placement surface", on which the air-cleaner main body of the air cleaner 44 is placed.

Next will be specifically described the placement state of the air cleaner 44.

The upper surface 43a of the fuel tank 43 as the air-cleaner placement surface is entirely so flat as to allow the air cleaner 44 to be placed thereon with no problem, and is provided with an oil feeding port 43b in a front portion of the upper surface 43a.

The air cleaner 44 is placed at a position deviated rearward, i.e., to an engine-room side, from the oil feeding port 43a so as not to superposed onto the oil feeding port 43a, that is, so as not to hinder the oil feeding, and placed so as to satisfy the following condition (I) and (II):

(I) the filter take-in and take-out port 48 and the end cover 50 are directed widthwise inward of the upper frame 32, that is, directed to the center-foothold-41 side, to allow the work for taking in and taking out the filter to be performed at the center foothold 41; and (II) the evacuator 52 protrudes downward beyond the air-cleaner placement surface, i.e., the upper surface 43a of the fuel tank 43, at a position deviated inward, that is, to the center foothold 41 side (the right side), from an inner end of the fuel tank 43.

Dusts discharged from the evacuator 52 as shown in FIG. 5 by large black points are, therefore, dropped at a position deviated rightward of the fuel tank 43 from the upper surface 43a of the fuel tank 43 as the air-cleaner placement surface.

The hydraulic excavator is further provided with a guard member 54 which covers the entire air cleaner 44 including the end cover 50. The guard member 54 is coupled to a proper part of the upper slewing body 2 openably and closably or detachably, for example, through not-graphically-shown hinges at a front side. The guard member 54 has an evacuator guard portion 54a. The evacuator guard portion 54a has a distal end, letting a space over the distal end be opened. As shown in FIGS. 4 and 5, the evacuator guard portion 54a is inclined toward the distal end so as to be extended under the evacuator 52 to cover the evacuator 52 at a bottom side thereof.

According to the first embodiment, dusts in the evacuator 52 are discharged at a position deviated outward from the upper surface 43a of the fuel tank 43 as the air-cleaner placement surface, thus being prevented from drop and deposition onto the air-cleaner placement surface to stain the air-cleaner placement surface or block the discharge port of the evacuator 52 and cause a loss of the dust discharge function. Thus preventing the dusts from drop or deposition onto the air-cleaner placement surface eliminates the necessity for taking measures for removing dusts as described in Japanese Patent Application Laid-open No. 2003-184670, thereby hindering negative effects such as structure complication or diffusion of dusts.

Furthermore, the evacuator 52, protruding downward beyond the air cleaner main body at a position deviated from the air-cleaner placement surface, i.e., the upper surface 43a, allows the entire air cleaner 44 to be low positioned, as compared with the case where the evacuator 52 is opposed to the air-cleaner placement surface. This enables the combined height of the fuel tank 43 and the air cleaner 44 to be possibly decreased, even in the case where the air-cleaner placement surface is set to the upper surface 43a of the fuel tank 43 at a high position for enlargement of the equipment space in the upper frame 32 as the first embodiment, to thereby allow increase in the total height of the machine and deterioration in view from the operator to be suppressed. Particularly, in the first embodiment with the three-dimensional placement of the fuel tank 43 and the air cleaner 44 immediately rearward of the cabin 39, suppressing the deterioration in the rearward view from the cabin 39 is significant.

Moreover, the evacuator 52, attached to the end cover 50 so as to be detachable integrally with the end cover 50, enables maintenance of the evacuator 52 to be performed simultaneously with maintenance of the filter.

Deviation of the evacuator 52 from the air-cleaner placement surface facilitates attachment and detachment of the end cover 50.

Besides, the guard member 54, including the evacuator guard portion 54a which extends to a position under the evacuator 52 to guard and conceal the evacuator 52 at the bottom side thereof, is capable of protecting the air cleaner 44 including the evacuator 52, that is, concealing it from the outside, and capable of reducing the diffusion area of dusts discharged from the air cleaner 44 to thereby suppress stain of peripheral equipment with the dusts. In addition, the inclination of the evacuator guard portion 54a toward the distal end thereof enables the evacuator guard portion 54a to smoothly release the dusts discharged from the evacuator guard portion 54a to the outside thereof to prevent the dusts from deposition.

The guard member 54 may be divided into a part which includes the evacuator guard portion 54a and covers the end cover 50 and a part which covers the other parts of the evacuator 52. This division facilitates the attachment and detachment operation of the end cover 50 and the take-in and take-out operation of the filter.

Next will be described the difference between the second embodiment and the first embodiment, with reference to FIGS. 7 and 8.

The second embodiment includes a fuel tank 43 which has an L-shaped cross section. Specifically, the fuel tank 43 has an upper surface including a high level surface and a low level surface which is positioned at the rear side of the high level surface and is lower than the high level surface, and an oil filling port 43b is provided in the front part of the high level surface. The second embodiment includes an air cleaner 44, which is placed on the low level surface corresponding to the air-cleaner placement surface, namely, on the upper surface 43a, so as to satisfy the following conditions:

(i) The filter take-in and take-out port 48 and the end cover 50 are directed to the widthwise outside (the left side) of the upper frame 32; and (ii) The evacuator 52 protrudes downward beyond the air-cleaner placement surface at a position deviated outward from an outer end of the low level surface of the upper surface 43a of the fuel tank 43, i.e., the air-cleaner placement surface.

The second embodiment also enables the working effects similar to those obtained in the first embodiment to be obtained. Furthermore, the air cleaner 44 according to the second embodiment, being placed on the low level surface of the upper surface 43a of the fuel tank 43, allows the combined total height of the fuel tank 43 and the air cleaner 44 to be more reduced to thereby secure rearward view from the inside of the cabin 39. Besides, placing the air cleaner 44 on the low level surface, i.e., on the rear part of the fuel oil upper surface 43a, so as to direct the filter take-in and take-out port 48 to the widthwise outside of the upper frame 32 allows the filter take-in and take-out port 48 and the evacuator 52 to be directed outward at a low position. This allows an operator, in a construction machine originally having a small height, to perform the take-in and take-out of the filter and the maintenance of the evacuator 52 on the ground with no need for climbing the center foothold 34

The present invention includes not only the first and second embodiments but also the following embodiments, for example.

(1) The fuel tank 43 according to the second embodiment can be modified to have an upper surface including a low level surface positioned forward of a high level surface, contrary to the second embodiment. Also in this case, it is preferable to provide the oil filling opening 43b to the high level surface and place the air cleaner 44 on the low level surface.

(2) The air cleaner 44 according to the second and third embodiments are also permitted to be placed so as to locate the filter take-in and take-out port 48 and the evacuator 52 widthwise inward of the upper frame 32.

(3) While the fuel tank 43 in the first and second embodiments is placed on the left side portion of the upper frame 32 and allows the air cleaner 44 to be placed on the fuel tank 43, it is also permitted that the hydraulic oil tank 40 is placed on the left side portion and allows the air cleaner 44 to be placed on the hydraulic oil tank 40. In this case, it is preferable that the evacuator 52 is disposed so as to protrude downward beyond the air-cleaner placement surface at a position deviated to the outside from the upper surface of the hydraulic oil tank 40 as the air-cleaner placement surface. Besides, the air-cleaner placement surface according to the present invention is not limited to an upper surface of a tank. The air cleaner according to the present invention may be placed on other equipment or other structure under the condition the evacuator protrudes downward beyond an air-cleaner placement surface at a position deviated outward from the air-cleaner placement surface.

(4) The present invention can be applied to not only the excavator but also similarly applied to various construction machines configured by utilization of the excavator.

As described above, the present invention provides a construction machine allowing an air cleaner to be located entirely low while securing dust-discharge function thereof, with no risk of adverse effects such as diffusion of dusts or complication in structure. The provided construction machine includes an engine and an air cleaner connected to an intake-side portion of the engine to filter intake air. The air cleaner includes an air-cleaner main body which filters the intake air and an evacuator which discharges dusts separated from the intake air and protrudes downward beyond the air-cleaner main body. The air-cleaner main body is placed on an air-cleaner placement surface, the evacuator protruding downward beyond the air-cleaner placement surface at a position deviated outward from the air-cleaner placement surface.

The above placement of the air cleaner allows dusts to be discharged at a position deviated outward from the air-cleaner placement surface, thereby preventing the dusts from being dropped and deposited on the air-cleaner placement surface to stain the air-cleaner placement surface or block a discharge port of the evacuator to cause the evacuator to lose its dust-discharge function. Besides, no drop and no deposition of dusts onto the air-cleaner placement surface eliminates the need for taking measures for removing the dusts to thereby hinder negative effects such as complication in structure and diffusion of the dusts. Furthermore, the evacuator, protruding downward beyond the lower surface of the air cleaner main body at a position deviated from the air-cleaner placement surface, allows the entire air cleaner to be positioned low, as compared with the case of an evacuator disposed so as to be opposed to the air-cleaner placement surface. Hence, even in the case of setting the air-cleaner placement surface at a high position, it is possible to locate the air cleaner as low as possible to thereby suppress the increase in the total height of the machine and deterioration in operator's view.

The construction machine according to the invention, preferably, further includes: a lower travelling body; an upper slewing body mounted on the lower travelling body so as to be slewable, the upper slewing body including an upper frame on which the engine and the air cleaner are mounted; and a tank mounted on the upper frame, the tank having an upper surface corresponding to the air-cleaner placement surface on which the air cleaner is placed. Thus three-dimensionally placing the air cleaner on the tank allows the total height of the tank and air cleaner to be reduced while increasing a space for equipment on the upper frame. This advantage is effective particularly in the case of placing the tank and the air cleaner immediately rearward of a cabin, because deterioration in rearward view from the cabin can be suppressed.

As to the air cleaner, it is preferable that: the air-cleaner main body includes a filter take-in and take-out port at an one-axial-end side of the air-cleaner main body; the air cleaner further includes an end cover configured to detachably attached to the air-cleaner main body so as to close the filter take-in and take-out port; and the evacuator is attached to the end cover so as to protrude downward beyond a lower surface of the end cover. Thus allowed integral attachment and detachment of the evacuator with the end cover enables maintenance of the evacuator to be performed simultaneously with maintenance of the filter. Besides, the evacuator, deviated from the air-cleaner placement surface, allows the end cover to be attached and detached easily.

In this case, it is more preferable that the construction machine further includes a guard member which covers the entire air cleaner including the end cover, the guard member including an evacuator guard portion which covers the evacuator at a bottom side thereof. The guard member can protect and conceal the air cleaner including the evacuator and suppress wide diffusion of discharged dusts to thereby suppress stain of peripheral devices therewith.

The evacuator guard portion of the guard member, preferably, includes a distal end letting a space over the distal end be opened, the evacuator guard portion being inclined toward the distal end. The inclination of the evacuator promotes release of dusts discharged from the evacuator to the outside of the guard member via the evacuator guard portion, thereby preventing the dusts from deposition inside the guard member.

This application is based on Japanese Patent application No. 2013-239423 filed in Japan Patent Office on Nov. 20, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine comprising:
an engine;
an air cleaner connected to an intake-side portion of the engine to filter intake air, the air cleaner including an air-cleaner main body which filters the intake air and an evacuator which discharges dusts separated from the intake air and protrudes downward beyond the air-cleaner main body; and
a guard member, wherein:
the air-cleaner main body is placed on an air-cleaner placement surface, the evacuator protruding downward beyond the air-cleaner placement surface at a position deviated outward from the air-cleaner placement surface;
the air-cleaner main body includes a filter take-in and take-out port at an axial end side of the air-cleaner main body;
the air cleaner further includes an end cover configured to be detachably attached to the air-cleaner main body so as to close the filter take-in and takeout port;
the evacuator is attached to the end cover so as to protrude downward beyond a lower surface of the end cover; and
the guard member covers the entire air cleaner including the end cover, the guard member including an evacuator guard portion which covers the evacuator at a bottom side thereof.

2. The construction machine according to claim 1, wherein the evacuator guard portion includes a distal end letting a space over the distal end be opened, the evacuator guard portion being inclined toward the distal end.

3. A construction machine comprising:
an engine;
an air cleaner connected to an intake-side portion of the engine to filter intake air, the air cleaner including an air-cleaner main body which filters the intake air and an evacuator which discharges dusts separated from the intake air and protrudes downward beyond the air-cleaner main body;
a lower travelling body;
an upper slewing body mounted on the lower travelling body so as to be slewable, the upper slewing body including an upper frame on which the engine and the air cleaner are mounted; and
a tank mounted on the upper frame, the tank having an upper surface,
wherein the upper surface of the tank is an air-cleaner placement surface and the air-cleaner main body is placed on the air-cleaner placement surface, the evacuator protruding downward beyond the air-cleaner placement surface at a position deviated outward from the air-cleaner placement surface.

4. The construction machine according to claim 3, wherein: the air-cleaner main body includes a filter take-in and take-out port at an axial end side of the air-cleaner main body; the air cleaner further includes an end cover configured to be detachably attached to the air-cleaner main body so as to close the filter take-in and take-out port; and the evacuator is attached to the end cover so as to protrude downward beyond a lower surface of the end cover.

* * * * *